Feb. 14, 1961 W. V. MILLMAN 2,971,450

DAMPER CONTROL APPARATUS FOR UNIT VENTILATOR

Filed July 3, 1958 4 Sheets-Sheet 1

INVENTOR
WILLIAM V. MILLMAN

BY Edward C. Arenz
ATTORNEY

DAMPER CONTROL APPARATUS FOR UNIT VENTILATOR

Filed July 3, 1958

INVENTOR.
WILLIAM V. MILLMAN
BY
Edward C. Arenz
ATTORNEY

Feb. 14, 1961 W. V. MILLMAN 2,971,450

DAMPER CONTROL APPARATUS FOR UNIT VENTILATOR

Filed July 3, 1958 4 Sheets-Sheet 3

INVENTOR.
WILLIAM V. MILLMAN

BY Edward C. Arenz

ATTORNEY

Feb. 14, 1961 W. V. MILLMAN 2,971,450
DAMPER CONTROL APPARATUS FOR UNIT VENTILATOR
Filed July 3, 1958 4 Sheets-Sheet 4

FIG. 12 VERTICAL SCALE IS % OF OUTDOOR AIR ADMITTED TO UNIT
FIG. 13 VERTICAL SCALE IS % OF ADMITTED AIR WHICH BYPASS HEAT EXCHANGER

INVENTOR.
WILLIAM V. MILLMAN
BY
Edward C. Arenz
ATTORNEY

United States Patent Office 2,971,450

Patented Feb. 14, 1961

2,971,450

DAMPER CONTROL APPARATUS FOR UNIT VENTILATOR

William V. Millman, Moline, Ill., assignor to American Air Filter Company, Inc., Louisville, Ky., a corporation of Delaware Filed July 3, 1958, Ser. No. 746,430

4 Claims. (Cl. 98—38)

This invention relates to damper control apparatus for unit ventilators of the type commonly referred to as "classroom" unit ventilators.

A recently proposed unit ventilator, exemplified by the copending Baker-Millman patent application 707,371, filed January 6, 1958, now U. S. Patent 2,909,043 issued October 20, 1959, is provided with a by-pass damper arrangement for controlling the proportions of air directed through and around the heat exchanger. This type of unit ventilator may or may not utilize a tempering-fluid control valve on the heat exchanger, but in either case it is desirable to control positioning of the by-pass damper means and the outdoor-room air damper means simultaneously and in accordance with the temperature requirements of the served room.

Such a unit ventilator is adapted for operation in one or another of various standard control cycles for heating and ventilating in cold weather and additionally may be operated in a satisfactory cycle for cooling and ventilating in hot weather. However, the provision of damper control apparatus presents a substantial problem in that such apparatus should be capable of accommodating various cycles while at the same time being sufficiently compact to be housed in the limited space of the unit ventilator end compartment. Further, such apparatus should be relatively inexpensive, positive in operation, readily adjustable and adapted to be controlled by a minimum of automatic temperature control components when such components are used.

It is thus one object of the invention to provide damper positioning apparatus for controlling the operation of the outdoor-room air damper means and the by-pass damper means in selected cycles of control.

Another object is to provide such apparatus arranged so that control is effected through rotation of a single master control shaft.

A further object is the provision of such apparatus in a form which permits operation in accordance with any selected standard control cycle by utilizing one or another correspondingly selected elements.

A still further object is the provision of damper positioning apparatus adapted to control damper operation satisfactorily in both winter and summer operational cycles.

Still another object is to provide such apparatus in a compact assembly of relatively simple and inexpensive elements.

In accordance with the present invention, a unit ventilator of the type having outdoor-room air damper means and separate by-pass damper means is provided with first and second linkage means respectively connected for operating each of the damper means individually. Rotatable cam means are provided with a first selected segment which directly engages the first linkage means and thus controls the positioning of the outdoor-room air damper means in accordance with the radial dimension of the cam means at the first linkage control point while the positioning of the by-pass damper means is effected in accordance with the radial dimension of the cam means at the second linkage control point where the second linkage means is directly engaged by a second selected segment of the cam means.

The present invention also contemplates the provision of cam means wherein the selected segments are on separate cam plates with the segments disposed on opposite sides of the master control shaft. It further contemplates the provision of auxiliary cam means adapted to alter the peripheral configuration of the selected segment to obtain different selected operational cycles.

These and other features of this invention will be described in connection with the accompanying drawing wherein one embodiment is illustrated and wherein.

Figure 1:
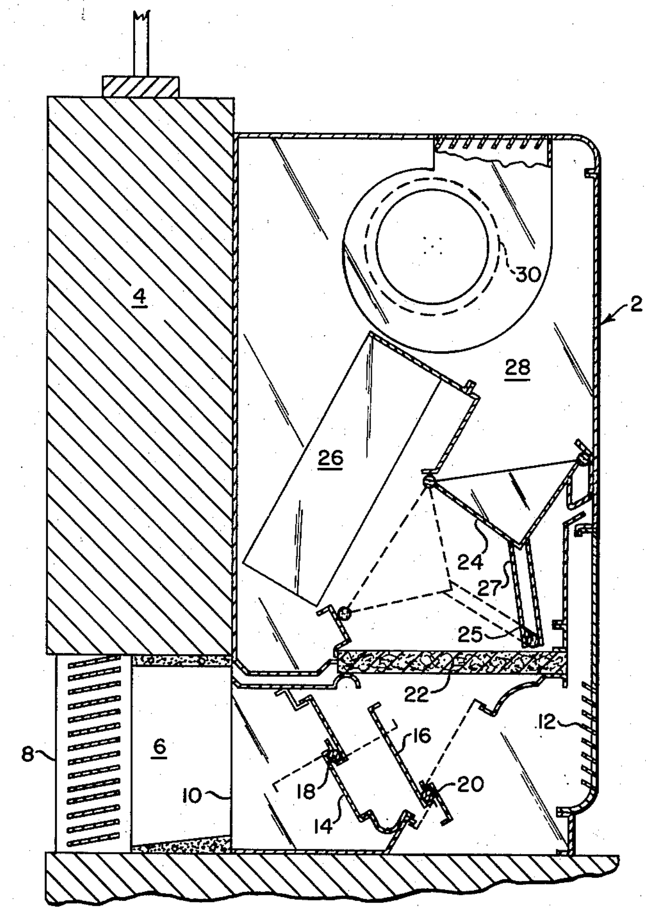
Figure 1 is a partly diagrammatic view in the nature of a vertical section through a unit ventilator having a by-pass damper arrangement.

Referring to Figure 1 the unit ventilator 2 is shown mounted against an outside wall 4 of the room. The wall is provided with an outdoor air passage 6 having a suitable wall intake louver 8 mounted in the passage. The unit ventilator is positioned so that its outdoor air inlet opening 10 is aligned with passage 6. The lower front panel of the unit is provided with means such as slots 12 which permit room air to be drawn into the lower part of the unit for recirculation.

An outdoor-air damper 14 and a room-air damper 16 are secured to rotatable shafts 18 and 20 respectively, these dampers being rotatable to various positions to control the proportions of air admitted to the unit from outdoors and from the room. The air admitted to the unit passes upwardly through a suitable air filter 22 and then, in accordance with the position of the by-pass damper 24 mounted on rotatable shaft 25, through the heat exchanger 26, through the by-pass passage 28, or in varying proportions by way of either path to the several centrifugal fans 30 which discharge the air into the room. It will be understood that the V-shaped portion of the by-pass damper, which is the portion which controls the direction of air flow through the unit, is supported by spaced straps or bars 27 laterally spaced from each other and forming an open-work frame secured to the by-pass damper shaft 25.

The damper positions illustrated with solid lines in Figure 1 indicate the positions of the dampers when 100% room air is being admitted to the unit and directed through the heat exchanger, while the dotted lines illustrate the damper positions when 100% outdoor air is being drawn into the unit and directed around the heat exchanger. These extreme positions are illustrated for example only, the dampers being operable to any intermediate position.

Figure 2:
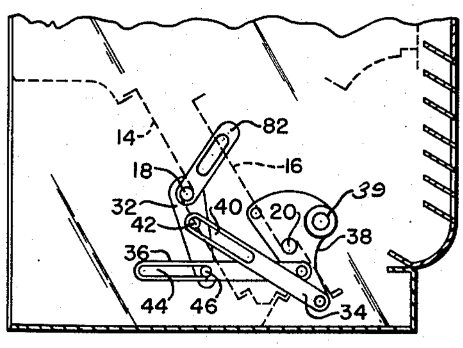
Figure 2 is an elevational view of damper linkage suitable for controlling the operation of the outdoor-room air dampers, the dampers and linkage being shown in a position which prevents the admission of outdoor air and permits 100% recirculated room air.
Figure 5:
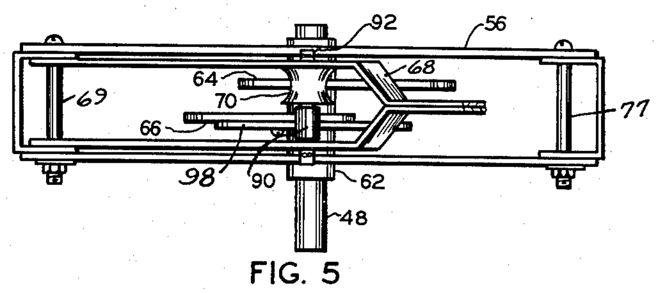
Figure 5 is a fragmentary plan view of the apparatus of Figure 4, with certain parts deleted for clarity.

The outdoor-room air damper linkage arrangement is illustrated in Figure 2 with the linkage positioning the outdoor and room air dampers to introduce 100% room air. The outdoor-air damper 14 is positioned by rotating the shaft 18 which projects into the end compartment a distance sufficient to mount a suitable crank arm. A crank 32 rigidly connected or fixed to shaft 18 rotates with the outdoor-air damper and serves, through links 34 and 36 to control crank 38 which is rigidly connected or secured to the room-air damper shaft 20. Link 34 has an elongated slot 40 which slides on pin 42 on crank 32 and link 36 has an elongated slot 44 which slides on pin 46 on crank 32. The linkage arrangement described affords simultaneous operation of both dampers to progressively increase or decrease the ratio of outdoor air to room air by simply rotating shaft 18.

During normal operation of the unit ventilator and with the dampers rotated to some intermediate position, pin 46 idles in slot 44 of link 36. The air pressure against the room-air damper from fan operation tends to hold the room-air damper open so that link 34 is positioned with pin 42 in contact with the end of slot 40 as is shown in Figure 2. Thus, rotation of the outdoor-air damper, shaft 18 and crank 32 in a clockwise direction from the Figure 2 position effects, through link 40, a simultaneous clockwise rotation of the room-air damper towards a closed position. The weight 39 fixed to control crank 38 provides a force in a clockwise direction counterbalancing the room air damper 16 and tending to urge it toward a closed position when permitted to do so by the relative position of the links 34 and 36.

The function of link 36 is to hold the room-air damper substantially open at night when the outdoor-air damper is closed and the fans are not operating. This permits convection of air from the room through the heat exchanger. The room-air damper is held open, for such operation, by pin 46 engaging the right hand end of slot 44. The slotted linkage arrangement permits the room-air damper to be rotated to a closed position by the force of any gust of wind through the outdoor air opening when the outdoor-air damper is at any position other than fully or nearly closed. The arrangement of outdoor-room air dampers and linkage has been described to aid in understanding the relationship with the hereinafter described control apparatus and is not, in itself, new.

Figure 3:
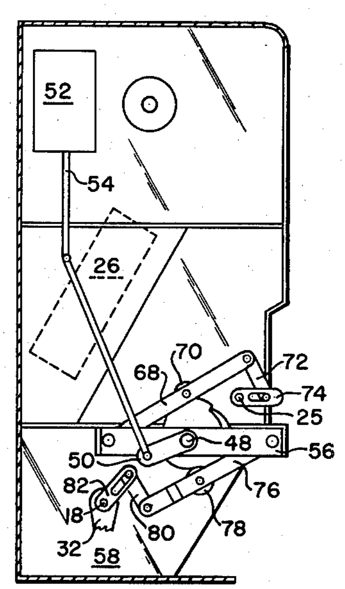
Figure 3 is an elevational view in an end compartment of a unit ventilator fitted with the master damper control apparatus of the present invention.

The master damper control apparatus shown in a mounted position in Figure 3 is operable to simultaneously control the rotative positions of both the outdoor-room air dampers and the by-pass damper 24. This is accomplished by controlling the rotation of master shaft 48 which, through linkage mechanism to be hereinafter described in some detail, controls the rotation of the shaft 18 and crank 32, and by-pass damper shaft 25. Shaft 48 has crank arm 50 fixed thereto, the arm 50 being rotatively powered by a suitable actuator 52 adapted to drive rod assembly 54.

The master damper control apparatus (Figures 3–6) comprises: a rectangular open-faced frame 56 disposed in a front to rear direction and fixedly mounted on a vertical partition 58 forming one wall of an end compartment in the unit; a horizontally disposed shaft 48 in sleeve 62 which is rotatably carried by the frame 56; a first vertically disposed cam 64 fixedly mounted on sleeve 62 so that the cam rotates with shaft rotation; a second vertically disposed cam 66 spaced from cam 64 and also fixedly mounted on sleeve 62 to rotate therewith; a bifurcated upper arm or linkage mechanism 68 pivotally secured at its bifurcated left end on axle 69 to the left end of frame 56, carrying a cam follower 70 in the yoke portion, and having a link 72 pivotally connected between the upper or right end of arm 68 and by-pass damper shaft crank 74 which is rigidly connected to shaft 25; a bifurcated lower arm 76 pivotally secured at its bifurcated right end on axle 77 to the right end of frame 56, carrying a cam follower 78 in its yoke portion, and having a link 80 pivotally connected between the lower or left end of arm 76 and crank 82 which is rigidly connected or secured to shaft 18; a tension spring 84 biasing the upper arm downwardly to maintain the cam follower 70 in contact with the periphery of cam 64 and to counterbalance the by-pass damper 24 which would tend, by its own weight, to rotate in a counterclockwise direction and thus lift cam follower 70 from cam 64; and, a tension spring 86 connected to crank 32 to bias the outdoor air-room air dampers towards a position in which the outdoor-air damper is closed.

Figures 4, 6:
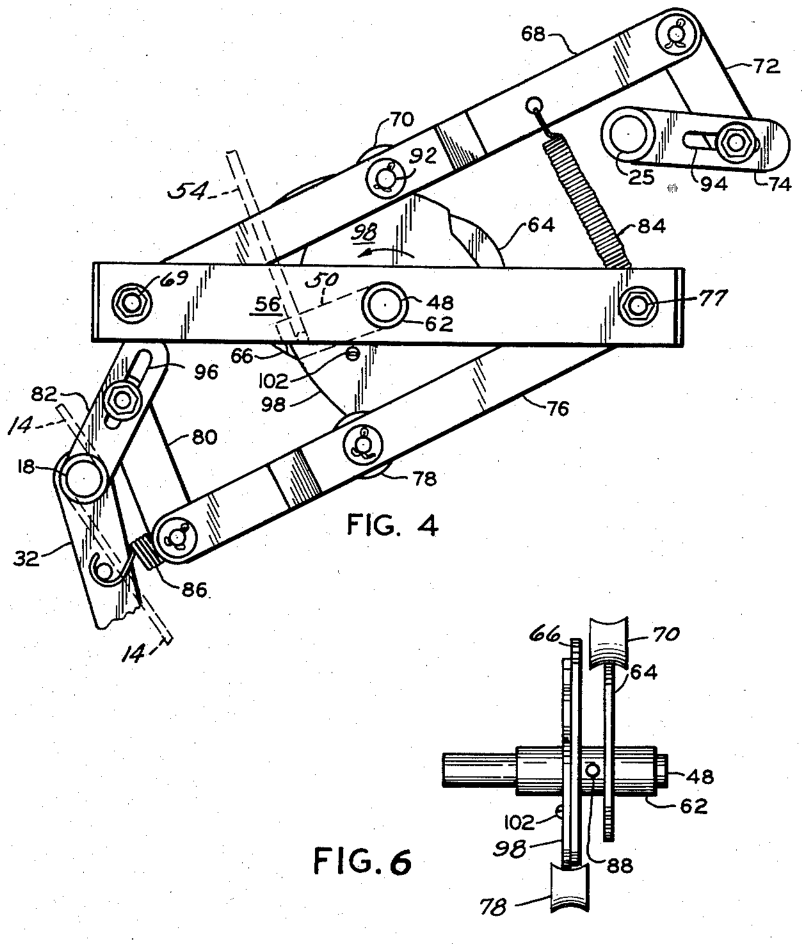
Figure 4 is an enlarged elevational view of the master damper control apparatus.
Figure 6 is a detail view in elevation of cam means mounted on a sleeve and shaft.

Since the frame 56 accommodates a separate cam for operation of each the upper and lower arm, these cams 64 and 66 are spaced apart on sleeve 62 (Figure 6). The sleeve is removably secured to shaft 48 by pin 88 to permit the sleeve-cam assembly to be removed from the shaft so that an alternate sleeve-cam assembly affording a changed damper operation may be substituted therefor.

To maintain the spool-like cam follower 70 in alignment with its cam 64, a spacer 90 is also mounted on axle 92 which is journalled in opposing branches of the yoke portion of upper arm 68. A similar but reversed arrangement is provided on the lower arm to properly align cam follower 78 with its cam 66.

By-pass damper crank 74, and outdoor-room air damper crank 82 are provided with slots 94 and 96 respectively to permit adjustment of the linkage during assembly.

Figures 7, 8:
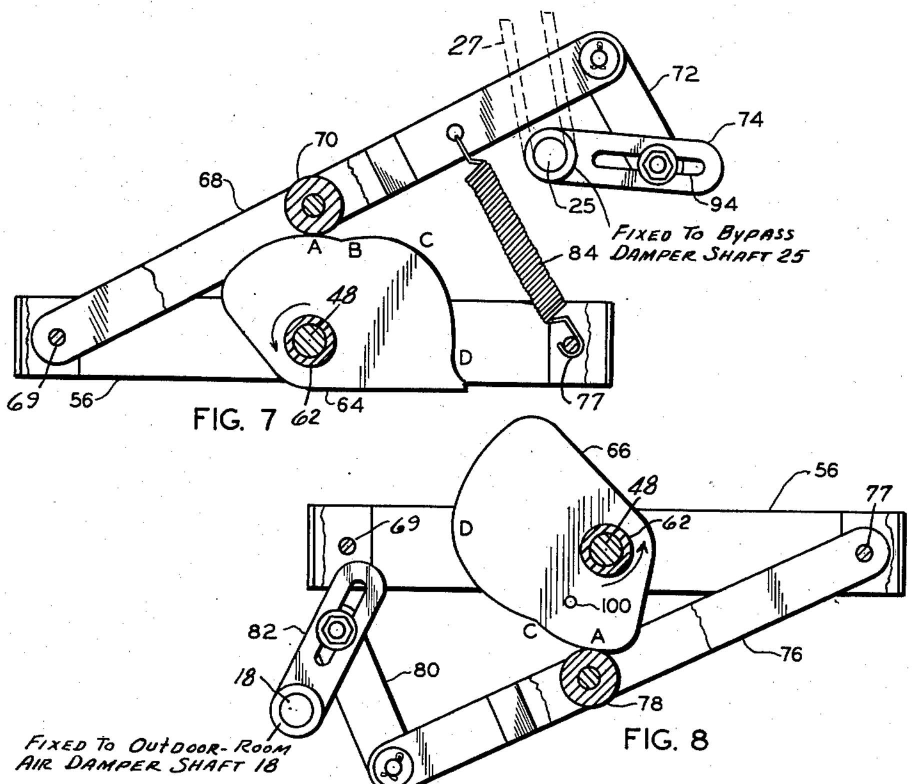
Figure 7 is a partly broken elevational view of the by-pass damper linkage and control cam therefor.
Figure 8 is a partly broken elevational view of the outdoor-room air damper linkage and control cam therefor.

In Figures 7 and 8, the upper arm 68 and lower arm 76 are shown separately to facilitate explanation of their operation. These figures illustrate the upper arm in a position holding the by-pass damper in its extreme clockwise position, and the lower arm in a position holding the outdoor-room air dampers in their extreme counterclockwise position.

Upon rotation of shaft 48 in a counterclockwise direction as indicated by the arrows, the cams 64 and 66 are simultaneously rotated in the same direction. The upper and lower arms, which are both rotatable in a counterclockwise direction from their illustrated positions, will be rotated about their fixed axes to a degree depending on the change in radius of the cams at the control point where the respective cam followers ride.

Referring to Figure 7, cam 64 has a uniform radius between points A and B, a progressively increasing radius from B to C, and a uniform radius between C and D. Thus, in the approximately 90° rotation between A and D: the by-pass damper is maintained in a position to direct all the air through the heat exchanger while the cam follower 70 rides on the cam segment from A to B; the by-pass damper is moved to progressively increase the proportion of air directed around the heat exchanger as the cam follower 70 rides on the cam segment from B to C; and, the by-pass damper is maintained in a position to by-pass all air around the heat exchanger as the cam follower 70 rides on the cam segment from C to D.

Referring to Figure 8, cam 66 has a uniform radius between points A and C, and a progressively increasing radius from C to D. Thus, in the approximately 90° rotation of cam 66 between A and D; the outdoor-room air damper remains in a position closed to outdoor air and open to room air between A and C; and is moved to progressively increase the ratio of outdoor air to room air as the cam follower 78 rides on the segment between C and D. The cam 66 having the illustrated peripheral configuration between points A and D and mounted relative to cam 64 in the angular disposition shown, is adapted to give a 0% minimum outdoor air cycle of operation. This means that outdoor air is not admitted to the unit until the by-pass damper has been moved to a position directing nearly all of the air around the heat exchanger.

Figure 12:
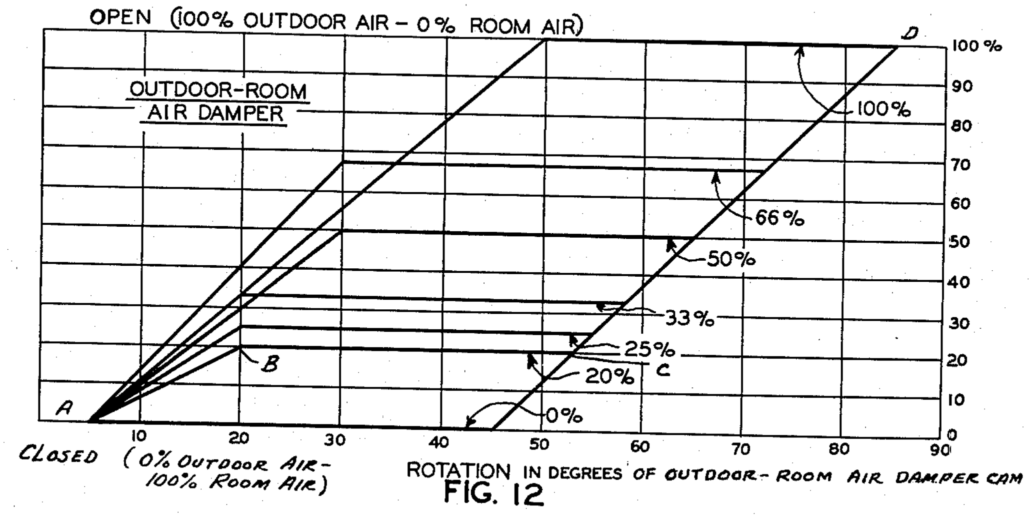
Figure 13:
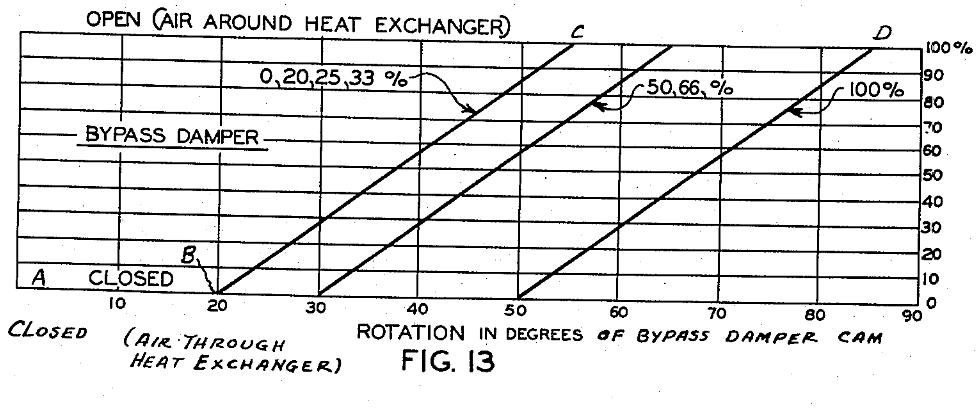

The positions of the by-pass damper and outdoor-room air dampers as cams 64 and 66 rotate through 90° is illustrated graphically in Figures 12 and 13. The abscissa in both figures indicates degrees of shaft and cam rotation. The ordinate in Figure 12 indicates the percentage of air admitted to the unit from outdoors (room air admitted being inversely proportional), and the ordinate in Figure 13 indicates the percentage of air directed around the heat exchanger (the air directed through the heat exchanger being inversely proportional thereto). The curves marked 0% indicate the relative position of the dampers as the cams 64 and 66 mounted as in Figures 7 and 8 are rotated through the heretofore described 90°.

Figure 9:
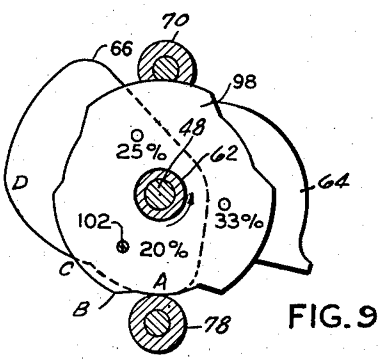
Figure 9 is a detail view illustrating an auxiliary cam secured to the outdoor-room air cam to obtain a selected control cycle.

Since it is often desirable or necessary to obtain a cycle of operation wherein a specified minimum percentage of outdoor air such as 20%, 25%, etc., is being introduced while the by-pass damper is modulating between its extreme positions, an auxiliary cam 98 as shown in Figure 9 may be secured to the basic cam 66 which controls the positioning of the outdoor-room air dampers. The cam 98 is provided as shown with three segments of different peripheral configuration of different radii which effectively increase the radial dimension of the basic cam 66 through the arc of rotation between points A and C. Figure 9 shows the auxiliary cam secured to cam 66 in an angular disposition to provide 20% minimum outdoor air. To obtain correct angular disposition of the selected peripheral segment giving the desired minimum outdoor air, three index holes marked as 20%, 25%, and 33%, are provided in the auxiliary cam and are aligned with a threaded index hole 100 in cam 66 which receives screw 102. This arrangement permits the selection of any of the three selected minimum outdoor air cycles by securing the auxiliary cam in the selected position. The 0% minimum outdoor air cycle may be obtained by simply removing the auxiliary cam.

Figure 10:
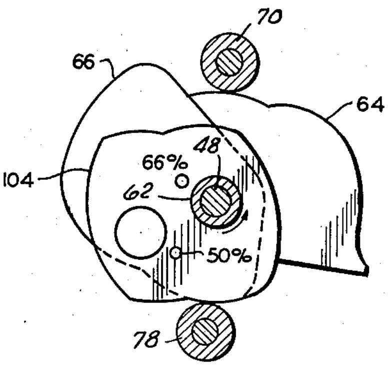
Figure 10 is a view illustrating another auxiliary cam secured to the outdoor-room air cam to obtain another selected control cycle.

Figure 10 illustrates an auxiliary cam 104 which may be used with cam 66 to obtain either a 50% or 66% minimum outdoor air cycle. To reduce the size of the cam 104, two sleeve receiving holes are provided, this arrangement necessitating that the cam 104 be removed from the sleeve 62 when it is desired to change the minimum outdoor air from 50% to 66% or vice versa. It is to be noted that although the same basic cam 66 is used in combination with cam 104 to obtain the 50% and 66% minimum outdoor air cycles, cam 66 is secured on sleeve 62 in a position rotated approximately 10° counterclockwise from its position when used to obtain the 0–33% minimum outdoor air cycles. The bypass damper cam 64 is secured in a 10° clockwise rotated position on sleeve 62 to maintain the by-pass damper in a closed position until cam 64 has rotated through approximately 30°.

Figure 11:
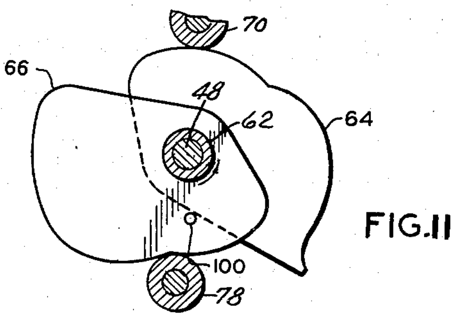
Figure 11 is a view showing the relative angular positions of the by-pass cam and outdoor-room air cam disposed to obtain a 100% minimum outdoor air cycle of operation; and, Figures 12 and 13 are graphs illustrating damper positions when utilizing various auxiliary cams and at different points in the rotation of the master control shaft.

Figure 11 illustrates a cam arrangement for obtaining a 100% outdoor air cycle. In this case the same by-pass cam 64 and basic outdoor-room air damper cam 66 are used, but cams 64 and 66 are secured on sleeve 62 in the rotated positions illustrated in Figure 10. This results in the upper cam follower 70 riding on a uniform radius for the first 50° rotation, while lower cam follower 78 rides on a progressively increasing radius during this 50° rotation.

By mounting the by-pass damper cam and outdoor-room air cam in the respectively described rotative positions for different minimum air cycles, the slope angles of the curves in Figure 12 are within a relatively narrow range and consequently the torque requirements for moving the dampers fall within a correspondingly narrow range. In other words, if the outdoor-room air damper were required to assume, say, a 66% minimum outdoor air position with only 20° of shaft rotation instead of the 30° shaft rotation illustrated, it would require considerably more power. In this same connection, it is to be noted that generally only one damper or the other is being moved at any specific point in the shaft rotation. Thus, the power requirements are substantially minimized.

The described arrangement permits the selection of any of the common operational cycles for cold weather or winter time operation. Thus, as an example of operation and referring to Figures 12 and 13, the following operation is obtained. Assume the auxiliary cam 98 is secured to cam 66 in a rotative position to obtain a 20° minimum outdoor air cycle. As shaft 48 is rotated through the first 20°, the by-pass damper remains in its closed position which directs all air admitted to the unit through the heat exchanger, while the outdoor-room air damper progressively opens to admit 20% outdoor air. During rotation from 20° to 55°, the by-pass damper moves progressively to its open position which permits all air admitted to the unit to by-pass the heat exchanger, while the outdoor air damper remains in the 20% minimum position. Progressive rotation from 55° to 90° results in the by-pass damper remaining in the open position while the outdoor air progressively increases to a maximum of 100%. Return rotation from 90° to 0° results in a reversed sequence of damper positioning, the springs 84 and 86 furnishing the power for moving the dampers. The other operational cycles of 25%, 33%, 50%, 66% and 100%, are obtained in substantially the same sequence as illustrated in Figures 12 and 13.

As will be apparent to those skilled in the art, the damper control apparatus readily lends itself for either manual operation or automatic temperature control systems. Thus, for an automatic temperature control system of a pneumatic character, it is only necessary to utilize a direct acting system (increase in pressure with increase in temperature) for wintertime operation, and a reverse acting system (increase in pressure with decrease in temperature) for summertime operation when a chilling medium is supplied to the heat exchanger.

It may be desirable to admit a reduced percentage of minimum outdoor air during summertime operation. If so, the present invention permits changing the minimum readily. Thus, for example, if the cam-sleeve assembly has been adjusted for a 33% minimum during winter operation, either 20% or 25% may be selected for summer operation by simply rotating the auxiliary cam—or 0% may be selected by removing the auxiliary cam. If the 50%–66% auxiliary cam has been used for winter operation, it may be removed for summer operation. If the 100% cam-sleeve assembly has been used for winter operation, it may be replaced with either of the other assemblies.

Having described my invention, I claim:

1. In a room unit ventilator having outdoor-room air damper means controlling the proportions of outdoor and room air admitted to said unit, and by-pass damper means for controlling the proportions of said admitted air directed through and around heat exchange means, damper control apparatus comprising: cam means mounted on a rotatable control shaft including a first cam having a first segment for controlling first linkage means, and a second and separate cam spaced on said shaft from said first cam and having a second segment for controlling second linkage means; first linkage means connected for controlling the position of said by-pass damper means and controlled by said first segment to obtain positioning of said by-pass damper in accordance with the radial dimension of said first segment at the first linkage control point; second linkage means connected for controlling the position of said outdoor-room air damper means and controlled by said second segment to obtain positioning of said outdoor-room air damper means in accordance with the radial dimension of said second segment at the second linkage control point; said first segment of said first cam is provided with a first selected peripheral configuration including an initial peripheral portion of uniform radius operative, as said control shaft is progressively rotated through the arc corresponding to said initial peripheral portion, to maintain said by-pass damper in a position to direct air admitted to said unit through said heat exchange means, an intermediate peripheral portion of progressively increasing radius operative, as said shaft is progressively rotated through the arc corresponding to said intermediate peripheral portion, to progressively increase the proportion of air directed around said heat exchanger, and a final peripheral portion of uniform radius operative, as said shaft is progressively rotated through the arc corresponding to said final peripheral proportion, to maintain said by-pass damper in a position to direct all air around said heat exchange means; said second segment of said second cam includes a second selected peripheral configuration including an initial peripheral portion of progressively increasing radius operative, as said shaft is progressively rotated through said arc corresponding to said initial peripheral portion, to progressively increase the percentage of outdoor air admitted to said unit ventilator, an intermediate peripheral portion of uniform radius to maintain said outdoor-room air damper in a position to permit the admission of a selected minimum percentage of outdoor air as said shaft is rotated through the arc corresponding to said intermediate peripheral portion; means for mounting said first and second cams relative to each other to obtain simultaneous rotation of both of said cams through said initial arc and through said intermediate arc; auxiliary cam means having a plurality of segments of radially extended peripheral configuration relative to said second segment configuration; and, means for detachably securing said auxiliary cam means in a selected angular disposition relative to said second cam to position one of said radially extended segments within the arc of rotation controlling said second linkage means.

2. In a room unit ventilator having outdoor-room air damper means in the lower portion thereof operable in accordance with the rotative position of its associated operating shaft for controlling the proportions of outdoor and room air admitted to said ventilator, and having by-pass damper means in the central portion of said ventilator operable in accordance with the rotative position of its associated operating shaft for controlling the proportions of said admitted air directed through and around heat exchange means disposed in said central portion, and having blower means in the upper portion of said ventilator operable to produce a fan-induced flow of ventilating air into said lower portion, through said central portion and out of said upper portion into said room, damper control apparatus for independently rotating said operating shafts in a predetermined sequence for obtaining a selected cycle of control, comprising: frame means disposed between said operating shafts; rotatable cam means carried by said frame means and having a first segment provided with a first selected peripheral configuration and a second segment provided with a second selected peripheral configuration; first linkage means disposed generally above said frame means for controlling the rotative position of said by-pass damper shaft in accordance with the rotative position of said cam means, said first linkage means including a first arm fixed to pivot about one stationary point with a second point of the first arm engaging the periphery of said first segment and a third point of the first arm connected to an actuating crank secured to said by-pass damper shaft for effecting rotation thereof in accordance with angular displacement of said first arm corresponding to a change in radius of said first segment where said second point engages it; second linkage means disposed generally below said frame means for controlling the rotative position of said outdoor-room air damper shaft in accordance with the rotative position of said cam means, said second linkage means including a second arm fixed to pivot about another stationary point with a second point of the second arm engaging the periphery of said second segment and a third point of the second arm connected to another actuating crank secured to said outdoor-room air damper shaft for effecting rotation thereof in accordance with angular displacement of said second arm corresponding to the change in radius of said second segment where said second point engages it; and said first segment includes an initial peripheral portion of uniform radius and a following peripheral portion of progressively increasing radius in one direction of cam means rotation, and said second segment includes an initial peripheral portion of progressively increasing radius and a following peripheral portion of substantially uniform radius in said one direction of cam means rotation, so that as said cam means is rotated in said one direction said second arm is initially angularly displaced to rotate said outdoor-room air damper shaft to increase the ratio of outdoor air to room air admitted to a selected ratio and then to maintain said ratio through further rotation in said one direction corresponding to said following peripheral portion of said second segment, and said first arm initially holds its position and is then angularly displaced to rotate said by-pass damper shaft to progressively increase the ratio of admitted air directed around said heat exchange means to admitted air directed through said heat exchanger through said same initial and following cam means rotation.

3. In a unit ventilator: outdoor-room air damper means for controlling the ratio of outdoor to room air admitted into the lower portion of said unit and operable, by rotation of a shaft having one crank fixed thereto, between one extreme position admitting all room air and an opposite extreme position admitting all outdoor air; by-pass damper means disposed in the central portion of said unit for controlling the ratio of admitted air directed through to admitted air directed around heat exchange means and operable, by rotation of another shaft having another crank fixed thereto, between one extreme position directing all admitted air through said heat exchange means and an opposite extreme position directing all admitted air around said heat exchange means; blower means for inducing air flow into said lower portion, through said central portion and out of an upper portion into a room; rotatable cam means mounted between said shafts and including a first segment having one selected configuration and a generally oppositely disposed second segment of another selected configuration; a lower lever fixed to pivot about its forward end, having its rear end connected by a link for rotating said one crank, and riding at an intermediate point on said second segment for angular displacement of said lever in accordance with a change in radius of said second segment; an upper lever fixed to pivot about its rear end, having its forward end connected to another link for rotating said other crank, and riding at an intermediate point of said first segment for angular displacement of said upper lever in accordance with a change in radius of said first segment; said second segment configuration includes, in one direction of cam means rotation, an initial portion of increasing radius, an intermediate portion of uniform radius and a final portion of further increasing radius whereby said lower lever in correspondingly angularly displaced, in said one direction of cam means rotation, to correspondingly rotate said one crank and operate said outdoor-room air damper means from said one to the other extreme position; and said first segment configuration includes, in said one direction of cam means rotation, an initial portion of uniform radius, an intermediate portion of increasing radius and a final portion of greater uniform radius whereby said upper lever is correspondingly angularly displaced, in said one direction of cam means rotation, to correspondingly rotate said other crank and operate said by-pass damper means from its said one to the other extreme position.

4. In a unit ventilator as specified in claim 3 wherein said cam means includes: a first cam containing said first segment; a second and separate cam containing said second segment; and means for independently securing said second cam relating to said first cam to permit obtaining a predetermined minimum percentage of outdoor air controlled by the radius of said intermediate portion of said second segment by selection of a particular second cam.

References Cited in the file of this patent

UNITED STATES PATENTS

| | | |
|---|---|---|
| 1,885,243 | Ewald | Nov. 1, 1932 |
| 2,229,304 | Shurtleff | Jan. 21, 1941 |
| 2,634,670 | Simons | Apr. 14, 1953 |
| 2,723,616 | Hubbard | Nov. 15, 1955 |